United States Patent [19]

McNerney et al.

[11] Patent Number: 5,199,136
[45] Date of Patent: Apr. 6, 1993

[54] BUTTON FOR ARTICLES OF CLOTHING

[75] Inventors: James P. McNerney, Arvada; Lynn D. Geving, Denver, both of Colo.

[73] Assignee: Coors Ceramicon Designs, Ltd., Golden, Colo.

[21] Appl. No.: 701,504

[22] Filed: May 16, 1991

[51] Int. Cl.⁵ .............................................. A44B 1/00
[52] U.S. Cl. .................................. 24/90 TA; 24/90 A
[58] Field of Search ............... 24/90 TA, 90 A, 90 R, 24/41, 7; 2/250, 49 A

[56] References Cited

U.S. PATENT DOCUMENTS

| | | | |
|---|---|---|---|
| 9,337 | 10/1852 | Welton | 24/90 A |
| 239,770 | 4/1881 | Guild | 24/90 TA |
| 453,064 | 5/1891 | Niles et al. | 24/90 A |
| 513,312 | 1/1894 | Esser | 24/90 A |
| 1,306,451 | 6/1919 | Turkltaub | 24/90 A |
| 1,322,963 | 11/1919 | Shantz | 24/90 A |
| 1,572,803 | 2/1926 | Lewis | 24/90 A |
| 1,581,706 | 4/1926 | White | 24/90 TA |
| 1,797,619 | 3/1931 | Purinton | 24/90 A |
| 2,081,485 | 5/1937 | Knott | 24/90 TA |
| 2,110,645 | 3/1938 | Carley | 24/90 TA |
| 2,175,029 | 10/1939 | Richmond et al. | 24/90 TA |
| 2,585,689 | 2/1952 | Schafer | 24/90 TA |
| 3,001,255 | 9/1961 | Schafer | 24/90 A |
| 4,067,745 | 1/1978 | Garvie et al. | |
| 4,279,655 | 7/1981 | Garvie et al. | |
| 4,420,102 | 12/1983 | Clark | 24/7 |
| 4,742,030 | 5/1988 | Masaki et al. | |
| 4,939,996 | 7/1990 | Dinkha et al. | |

FOREIGN PATENT DOCUMENTS 1154793 11/1983 Canada .
8030025.6 3/1980 European Pat. Off. .
0290187 2/1915 Fed. Rep. of Germany ... 24/90 TA

OTHER PUBLICATIONS

"Scramble Is On To Develop The Unbreakable Button", published in the *New York Times*, Sep. 11, 1989.
"All Broken Up: Shirt Maker Tackles That Button Problem", *Milwaukee Journal*, Dec. 27, 1989.
"Fracture Mechanics Determinations", by A. P. G. Evans in *Fracture Mechanics of Ceramics*, vol. 1, edited by R. C. Bradt, D. P. H. Hasselman and F. F. Lange, Plainman Press, New York, p. 17, (1974).
"Precipitation During Controlled Cooling of Magnesia-Partially Stabilized Zirconia" J. Am. Ceram. Osc., 69, 556–563 (1986), by Hughan et al.

*Primary Examiner*—Victor N. Sakran
*Attorney, Agent, or Firm*—Sheridan, Ross & McIntosh

[57] ABSTRACT

The present invention relates to a button that has improved strength and an improved resistance to deterioration. The button is preferably made from a ceramic material, such as partially stabilized zirconia, alumina, zirconia-alumina composites, or silicon carbide whisker reinforced ceramics. The button has a high strength, durability, and will often out-last the article of clothing on which it is placed.

5 Claims, 1 Drawing Sheet

BUTTON FOR ARTICLES OF CLOTHING

FIELD OF THE INVENTION

The present invention relates to an improved button that is useful for articles of clothing and the like. More particularly, the present invention relates to a button having improved properties that is fabricated from a ceramic material.

BACKGROUND OF THE INVENTION

In the past, buttons, particularly buttons for dress shirts, were fabricated from mother-of-pearl. The mother-of-pearl was durable and met the requirements of the clothing industry for many years. Nonetheless, much of the clothing industry switched to a less expensive polyester resin material when easy-care permanent-press fabrics were introduced in the 1960's While the polyester resin buttons are sufficient for shirts that do not require pressing, they do not perform well when subjected to the hot presses and commercial laundering detergents that are now widely used, particularly for all-cotton shirts. Commercial laundering subjects the buttons to significant wear and stress, and the polyester resin tends to become brittle with age. A men's dress shirt is particularly prone to these problems because the smaller collar and cuff buttons are more likely to break than larger buttons.

Button breakage presents a significant problem for the commercial laundering business, as well as the consumer Commercial laundries must often replace the buttons that are broken during the laundering process. Commercial laundries use a large number of buttons due to this problem and often employ one or more persons whose sole responsibility is to replace broken buttons. This costs the laundry a great deal of money for manpower and materials.

The dress shirt industry has recognized this problem and has expended a great deal of time and effort to identify a practical solution. See, for example, the article "Scramble Is On to Develop the Unbreakable Button," published in the *New York Times* on Sep. 11, 1989. It is disclosed therein that experts have experimented with buttons having different materials, shapes, sizes, and thicknesses. Also see the article "All broken up: Shirt maker tackles that button problem," in the *Milwaukee Journal*, Dec. 27, 1989.

Despite this long felt need by the clothing industry and the efforts exerted by the industry, a practical solution to the problem has not previously been identified.

For the button to be useful, the button must have a high strength and be resistant to corrosion from extremely hot steam presses, high concentrations of dry cleaning solvents or detergents, and the like.

SUMMARY OF THE INVENTION

The present invention provides a button for an article of clothing, wherein the button includes a ceramic material. Preferably, the ceramic material has a strength of at least about 250 MPa and a critical stress-intensity factor of at least about 3 to 4 MPam$^{\frac{1}{2}}$. In one embodiment, the ceramic material has the strength of at least about 300 MPa. The ceramic material is preferably selected from the group consisting of partially stabilized zirconia alumina, alumina-zirconia composites, and silicon carbide (SiC) whisker-reinforced composites. In a more preferred embodiment, the button consists essentially of magnesia-partially stabilized zirconia. In yet another embodiment, the button is substantially white in color.

The button according to the present invention is highly resistant to deterioration caused by dry cleaning solvents and detergents. Further, it is able to withstand high temperatures and high stresses that it can be exposed to during cleaning and pressing operations and during use.

In a more preferred embodiment, the button consists essentially of a magnesia-partially stabilized zirconia having a strength greater than about 350 MPa and a critical stress-intensity factor greater than about 8 MPam$^{\frac{1}{2}}$, and the button is substantially white.

The present invention also provides a dress shirt having a torso section with a plurality of buttons and a pair of sleeves attached to the torso section. The buttons consist essentially of a ceramic material having a strength of at least about 350 MPa and a critical stress-intensity factor of at least 8 MPam$^{\frac{1}{2}}$. In one embodiment, the dress shirt is fabricated from substantially 100% cotton.

DESCRIPTION OF PREFERRED EMBODIMENTS

Figure 1:
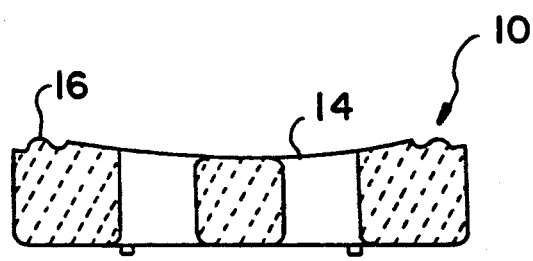
FIG. 1 illustrates a cutaway side view of a button in accordance with the present invention.

The present invention is directed to a button fabricated from a ceramic material that is particularly useful for clothing. The ceramic material preferably has sufficient strength to remain intact when subjected to high stresses, is highly resistant to heat, and is highly resistant to degradation when subjected to chemicals such as dry-cleaning solvents, and the like.

The ceramic material preferably has sufficiently high strength and fracture toughness such that there is a high probability of survival under severe stresses. Such severe stresses can occur, for example, when a shirt is pressed in a commercial press or tumbled in a hot dryer. An acceptable ceramic material preferably possesses a tensile strength, measured according to ACMA Test No. 4, of more than about 250 MPa, preferably more than about 300 MPa, and most preferably more than about 350 MPa. The ceramic material has a critical stress intensity factor of greater than about 3 to 4 MPam$^{\frac{1}{2}}$, preferably greater than about 6 MPam$^{\frac{1}{2}}$, more preferably greater than about 8 MPam$^{\frac{1}{2}}$, and most preferably greater than about 12 MPam$^{\frac{1}{2}}$. The critical stress intensity factor can be measured according to the single-edge notched beam (SENB) test, as described in Evans, A. G., "Fracture Mechanics Determinations" in *Fracture Mechanics of Ceramics*, Volume 1, edited by R. C. Bradt, D.P.H. Hasselman and F.F. Lange, Plenum Press, NY, pg. 17, (1974), incorporated herein by reference in its entirety.

Examples of ceramic materials which can preferably be used in producing the ceramic button according to the present invention include zirconias, particularly partially stabilized zirconias, such as magnesia-, calcia-, yttria-or ceria-partially stabilized zirconias. Examples of these materials are described in: European Patent Application No. 8030025.6, Publication No. 0013599, filed Mar. 1, 1980 by Commonwealth Scientific and Industrial Research Organization; U.S. Pat. No.

4,067,745, by Garvie et al., issued Jan. 10, 1978, entitled "Ceramic Materials"; U.S. Pat. No. 4,885,266 by Hughan et al., issued Dec. 5, 1989, entitled "Zirconia Ceramic Materials and Method for Making Same"; and Canadian Patent No. 1,154,793, by Otagiri et al., issued Nov. 4, 1983, entitled "Zirconia Ceramics and Method of Producing the Same." All of the foregoing documents are incorporated herein by reference in their entirety.

A preferred method for fabricating magnesia-partially stabilized zirconia according to the present invention is described in U.S. Pat. No. 4,939,996, by Dinkha et al., incorporated herein by reference in its entirety.

In this method, sufficient magnesium oxide or a material capable of forming magnesium oxide such as magnesium carbonate, is combined with the zirconium dioxide powder to provide an effective magnesium oxide level in the ceramic of from about 2.6 to about 3.8 weight percent. These mixed powders are preferably calcined between about 1000° C. and about 1700° C., more preferably between about 1000° C. and about 1500° C., for between about 4 and about 12 hours, preferably from about 6 to about 10 hours. The resulting calcined mixture is wet milled until the average particle size is preferably between about 0.8 and 2.5 micrometers, more preferably about 1.5 micrometers. If needed, a sufficient amount of fugitive organic binder is added to allow formation of a compact green body. The amount needed depends on the method of formation and the particular binder used. Ordinarily the level of the binder is between 0.1 and about 7 weight percent of the calcined mixture with the preferred level being about 1.5 to about 2.8 percent. The mixture is then dried by evaporation of the water, preferably by spray drying. The dried powder is then formed into a compact of the desired shape, such as a button having four thread holes, preferably by dry pressing. Dry pressing will permit the button to have a contour and/or ridge, if desired.

The formed compact is then heated from ambient temperature at a rate of between about 25° C. per hour and about 250° C. per hour, preferably about 100° C. per hour, to a soak temperature of between about 1675° C. and about 1800° C., preferably between about 1700° C. and 1750° C. This soak temperature is held for between about 1 and about 10 hours, preferably for about 2 to about 6 hours. The sintered article is then cooled using a cooling procedure such as described in Robert R. Hughan, "Precipitation During Controlled Cooling of Magnesia-Partially Stabilized Zirconia," J. Am. Ceram. Soc. 69, 556–563 (1986), incorporated herein by reference in its entirety. A preferred procedure involves cooling the sintered body at a rate of between about 250° C. and about 800° C. per hour, preferably between about 350° C. and about 500° C. per hour, to a temperature between about 800° C. and about 1400° C., preferably between about 800° C. and about 1000° C. The sintered article can then be furnace cooled to room temperature.

The sintered ceramic buttons according to the present invention are preferably polished in, for example, a geocentrifugal polisher. The polishing step gives the ceramic buttons a smooth and pleasing surface finish.

Other materials that can be useful for producing the button according to the present invention include alumina, alumina-zirconia composites ($Al_2O_3$—$ZrO_2$) having 5 to 90 weight percent $ZrO_2$ and 10 to 95 weight percent $Al_2O_3$, the $ZrO_2$ fraction containing from 0 to 6 weight percent $Y_2O_3$; and SiC Whisker-reinforced ceramics, e.g., SiC whisker-reinforced alumina or SiC whisker-reinforced mullite.

It has been found that magnesia-partially stabilized zirconia is less susceptible to flawing from stresses typically incurred during use than, for example, yttria-partially stabilized zirconia. Magnesia-partially stabilized zirconia has increased critical stress-intensity values ($K_{IC}$) for millimeter-scale flaw sizes, when compared with yttria-partially stabilized zirconia, even though yttria-partially stabilized zirconia is often superior for small flaw sizes. Thus, magnesia-partially stabilized zirconia is a preferred ceramic material for use in the button. An example of magnesia-partially stabilized zirconia is transformation-toughened zirconia (TTZ) produced by the Coors Ceramics Company, Golden, CO, having a tensile strength at 25° C. (ACMA Test No. 4) of about 352 MPa and a critical stress-intensity factor (single edged notched beam test) of at least about 8 MPam$^{\frac{1}{2}}$.

Partially stabilized zirconias are particularly useful since very low structural failure rates are desired, such as on the order of less than a few parts per million. It has been found that the preferred zirconia materials, such as magnesia-partially stabilized zirconia, may have a lower average strength than less preferred materials when analyzed at a high failure rate level such as 50 percent, but that these same preferred materials will provide a better average strength when analyzed at a lower level of failure rate, such as 5 to 100 parts per million, or less. That is, when articles fabricated from the preferred materials are subjected to the stress levels typically encountered by a button, the probability of failure (breakage) will be very low.

Zirconia materials provide an additional advantage according to the present invention, since these materials sinter to a white or substantially white finish. This is desirable since the largest percentage of buttons produced for the clothing industry have a white or substantially white color. As used herein, the term substantially white includes shades such as ivory.

One advantage to using an alumina based ceramic for the ceramic button according to the present invention, is that the alumina is more readily colored than other materials. For example, small amounts of rare earth oxides or other metal oxides can be added to the alumina without substantially changing the strength characteristics of the material. Zirconia materials, particularly magnesia-partially stabilized zirconia, are difficult to color without applying an external coating.

Figure 2:
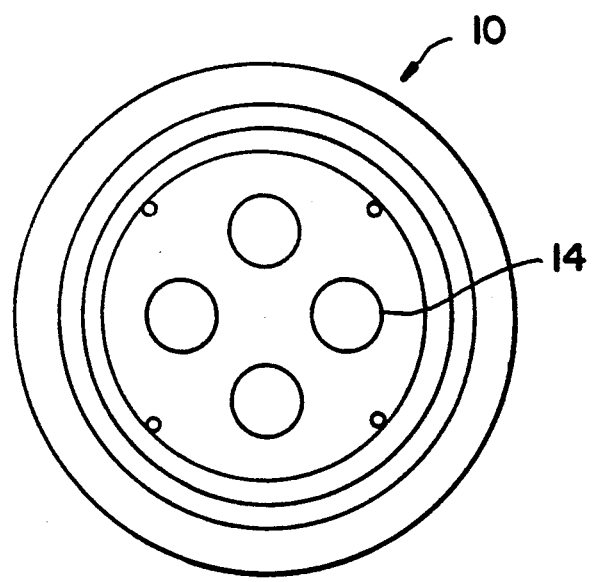
FIG. 2 illustrates a top view of a button in accordance with the present invention.

FIGS. 1 and 2 depict an embodiment of a button 10 according to the present invention. The button includes holes 14 useful for attaching the button to an article of clothing. The button is also contoured and has a ridge 16 for a pleasing aesthetic appearance.

The buttons of the present invention have been tested to compare their properties to buttons of the prior art. The results of this test are shown in Table I.

TABLE I

| Button Type | Impact Test (oz./in.) | Compression Test (lb.) |
|---|---|---|
| Plastic 4-hole | 5.35 | 1850 |
| Plastic 2-hole | 4.95 | 2058 |
| Ceramic | 30.52 | 2401 |

The impact strength is measured by a swing-arm test. The compression test is performed on a laboratory press equipped with two self-aligning flat plates. The button being tested is centered on a lower plate and pressure is applied. The first audible crack indicates part failure.

Table I shows that a ceramic button according to the present invention can have an impact strength of almost six times the impact strength of the plastic buttons. The compressive strength of the ceramic button shows an increase of from 17 to 30 percent over the prior art.

The buttons were also tested in a washing and pressing operation. The ceramic buttons and plastic buttons were attached to two test shirts, and then washed and pressed on nine different washer/press set-ups. This was done to evaluate each button when processed through variations in wash, as well as press conditions.

The shirts were monitored for button breakage at each wash and press cycle for fracturing. Both the first and second fracture of a plastic button occurred at the first pressing step, in a 13 ligne (0.325 inch diameter) collar button. Comparatively, the first fracture of one ceramic button according to the present invention occurred in a 13 ligne button on the fifteenth washing. No additional fracturing of any other ceramic buttons was detected for 32 consecutive cycles, and the test was stopped due to shirt deterioration. Thus, the buttons according to the present invention will often outlive the shirt on which they are sewn.

The buttons according to the present invention are stronger than typical mass produced buttons that are presently available and are highly resistant to detergents and dry-cleaning solvents used in present commercial cleaning processes. The present invention satisfies a long-felt need by the clothing industry for a button having these characteristics.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A button for an article of clothing, said button comprising a ceramic material selected from the group consisting of zirconia, alumina, alumina-zirconia composites, and SiC whisker-reinforced comosies, said ceramic material having a strength of at least about 250 MPa and a critical stress-intensity factor of at lest about 6 MPam$^{\frac{1}{2}}$, for the purpose of reducing breakage of the button, wherein said ceramic is resistant to deterioration from dry cleaning solvents and detergents.

2. A button as recited in claim 1, wherein said ceramic material has a strength of at least about 300 MPa and a critical stress-intensity factor of at least about 8 MPam$^{\frac{1}{2}}$.

3. A button as received in claim 1, wherein said button consists essentially of partially stabilized zironcia.

4. A button as recited in claim 1, wherein said button consists essentially of magnesia-partially stabilized zirconia.

5. A button as recited in claim 1, wherein said button has an impact strength of at least about 30 oz./in.

* * * * *